(12) United States Patent
Kneppers et al.

(10) Patent No.: US 9,064,290 B2
(45) Date of Patent: Jun. 23, 2015

(54) METHOD FOR INSPECTING A PHYSICAL ASSET

(75) Inventors: Adolph Johannes Kneppers, Walnut Creek, CA (US); Alan Malcolm Corkhill, Berkeley, CA (US)

(73) Assignee: JKADS LLC, Walnut Creek, CA (US)

( * ) Notice: Subject to any disclaimer, the term of this patent is extended or adjusted under 35 U.S.C. 154(b) by 1005 days.

(21) Appl. No.: 13/013,077

(22) Filed: Jan. 25, 2011

(65) Prior Publication Data

US 2012/0023435 A1 Jan. 26, 2012

Related U.S. Application Data

(60) Provisional application No. 61/367,365, filed on Jul. 23, 2010.

(51) Int. Cl.
*G06F 3/048* (2013.01)
*G06F 3/0484* (2013.01)
*G06Q 50/16* (2012.01)
*G06Q 90/00* (2006.01)

(52) U.S. Cl.
CPC .............. *G06Q 50/16* (2013.01); *G06F 3/0484* (2013.01); *G06F 3/048* (2013.01); *G06Q 90/00* (2013.01)

(58) Field of Classification Search
None
See application file for complete search history.

(56) References Cited

U.S. PATENT DOCUMENTS

| | | | | |
|---|---|---|---|---|
| 6,192,112 | B1 * | 2/2001 | Rapaport et al. | 379/88.22 |
| 6,446,053 | B1 * | 9/2002 | Elliott | 705/400 |
| 7,774,743 | B1 * | 8/2010 | Sanchez et al. | 717/103 |
| 2002/0062403 | A1 * | 5/2002 | Burnett et al. | 709/318 |
| 2002/0064766 | A1 * | 5/2002 | Cozens et al. | 434/350 |
| 2002/0065698 | A1 | 5/2002 | Schick et al. | |
| 2003/0040934 | A1 * | 2/2003 | Skidmore et al. | 705/1 |
| 2004/0068690 | A1 * | 4/2004 | Wood | 715/500 |
| 2004/0148243 | A1 * | 7/2004 | Rosenblatt | 705/37 |
| 2004/0225522 | A1 * | 11/2004 | McCaig et al. | 705/1 |
| 2004/0226048 | A1 * | 11/2004 | Alpert et al. | 725/109 |
| 2004/0260594 | A1 | 12/2004 | Maddox | |
| 2004/0267595 | A1 * | 12/2004 | Woodings et al. | 705/9 |
| 2006/0136824 | A1 * | 6/2006 | Lin | 715/531 |
| 2006/0259392 | A1 * | 11/2006 | Rabenold et al. | 705/37 |
| 2007/0136077 | A1 | 6/2007 | Hammond et al. | |
| 2007/0194102 | A1 * | 8/2007 | Cohen et al. | 235/379 |
| 2008/0033951 | A1 * | 2/2008 | Benson | 707/8 |

(Continued)

OTHER PUBLICATIONS

Home Inventory, Sep. 2, 2009 and Nov. 6, 2009, https://web.archive.org/web/20090902113604/http://www.gottahaveitsoftware.com/Home.html.*

(Continued)

*Primary Examiner* — Matt Kim
*Assistant Examiner* — Ryan Barrett
(74) *Attorney, Agent, or Firm* — Gard & Kaslow LLP

(57) ABSTRACT

A method of inspecting a physical asset using a mobile computing device is disclosed. Data regarding the asset and its condition is collected on the mobile device by a user, and may include photographs, audio or video recordings, text or other types of data. The data is automatically annotated with the current time and the geo-location of the device. The data is transmitted to a server and saved in a manner such that it may not be modified. This allows for auditing, as well as tracking of the asset over time by comparing data entered at one time with data entered at another time. Reports may be automatically generated from the saved data when desired. Pre-defined fields for data entry may be presented for ease of use. In some embodiments, the asset being inspected is a building, house or apartment.

22 Claims, 10 Drawing Sheets

(56) References Cited

U.S. PATENT DOCUMENTS

| | | | |
|---|---|---|---|
| 2008/0103991 A1* | 5/2008 | Moore et al. | 705/400 |
| 2008/0123934 A1 | 5/2008 | Amidi | |
| 2008/0177665 A1* | 7/2008 | Noordam | 705/50 |
| 2008/0263465 A1* | 10/2008 | Fox et al. | 715/764 |
| 2009/0076726 A1* | 3/2009 | Gemignani et al. | 701/213 |
| 2009/0112627 A1* | 4/2009 | Berkman et al. | 705/3 |
| 2009/0116645 A1* | 5/2009 | Jeong et al. | 380/259 |
| 2009/0138113 A1* | 5/2009 | Hoguet | 700/98 |
| 2009/0157521 A1* | 6/2009 | Moren et al. | 705/26 |
| 2009/0174768 A1* | 7/2009 | Blackburn et al. | 348/130 |
| 2009/0276273 A1* | 11/2009 | McIntosh | 705/8 |
| 2010/0100406 A1* | 4/2010 | Lim | 705/7 |
| 2010/0127922 A1* | 5/2010 | Sooy | 342/357.09 |
| 2010/0149211 A1* | 6/2010 | Tossing et al. | 345/628 |
| 2010/0153168 A1 | 6/2010 | York et al. | |
| 2011/0057029 A1* | 3/2011 | Daniel | 235/380 |
| 2012/0151318 A1* | 6/2012 | Hays et al. | 715/221 |
| 2012/0174001 A1* | 7/2012 | Friedman et al. | 715/763 |
| 2014/0095122 A1* | 4/2014 | Appleman et al. | 703/1 |

OTHER PUBLICATIONS

Loshin, "Monitoring Data Quality Performance Using Data Quality Metrics," Nov. 2006, https://it.ojp.gov/documents/informatica_whitepaper_monitoring_dq_using_metrics.pdf.*

* cited by examiner

METHOD FOR INSPECTING A PHYSICAL ASSET

This application claims priority from Provisional Application No. 61/367,365, filed Jul. 23, 2010, which is incorporated by reference in its entirety.

FIELD OF THE INVENTION

The present invention relates generally to inspecting physical assets. More specifically, the invention relates to a method for recording on a server accessed over, for example, the internet, data collected from an inspection of a physical asset using a mobile device, in a way that provides for full tracking and auditing.

BACKGROUND OF THE INVENTION

Historically, collecting and recording information about the condition of a physical object, such as a house or other building, vehicle, painting or other artwork, etc., has generally required inspectors with specialized knowledge and training, often using specialized tools, and typically resulting in the production of specialized reports. While there are many occasions when the inspection of, and recording of information about, an asset might be useful to increase knowledge about the asset, track its condition over time, or otherwise reduce some risk related to the asset, in many such cases the inspection is not done because of the effort and expense of getting the needed specialists involved, along with the required tools. Accordingly, such inspections and reports are often reserved for special events where the need for information or protection of the asset is great enough that the time and expense of undertaking an inspection is considered to be justified when compared to the risk involved in not doing an inspection. Further, the data collected, and the reports generated, are generally not standardized in any way.

While some assets are movable, in the case of a house or other building an inspection must be done by examining the asset where it is located, away from an office where any resulting report might be compiled. Even in the case of movable assets it may be desirable to inspect an asset where it is located rather than transporting the asset to an inspector's office, particularly where there is any risk created by moving the asset (e.g., rare cars, paintings, etc.).

Depending upon the type of asset and the objective of an inspection, the inspection may involve the collecting of many different pieces and types of data. For example, an inspection may involve identifying a location, taking notes, making sketches, dictating voice memos, marking up plans or documents, and/or taking photos or videos. Since many inspections are done where the asset is located, as above, inspectors have traditionally been required to carry all of the equipment that may be required to collect the various types of data related to the asset.

Further, while various mobile devices providing telephone and/or Internet access have become more common, there is no guarantee that an inspector will have access during the inspection to any information that is not either already known to the inspector or also carried in some fashion. If some information is required during the inspection that is not known or available to the inspector, a decision may have to be made whether to ignore the lack of the information, postpone the inspection, or at least a portion thereof, or abandon the inspection. Finally, because an inspection is generally a special, one-time (or rare) event, the time for the inspection process may be limited. There is thus usually pressure to ensure that all data is collected systematically and efficiently in a time-effective manner so that the allowed time is not exceeded.

After the on-site inspection process is complete, typically some processing of the collected data has to occur. This has traditionally been done later, often back at the inspector's office. For example, photos may have to be downloaded, printed and reviewed, transcripts of voice recordings prepared, handwritten notes assembled and all of the collected data correlated before any meaningful review, analysis or reporting can take place. Finally, after the on-site inspection and post-inspection processing, a report is typically prepared.

However, in some cases a significant period of time may have passed between the collection of field data and such post-inspection processing. Such instances can create problems in the preparation of a report. For example, memories may fade over time, and what was obvious when the inspection was being conducted may become obscure when trying to match photos with notes or floor layouts at a subsequent time. This is especially so if the data was collected months before such processing, or by a different person than the reviewer, perhaps even someone who has since left the organization.

In some cases, a database may be created to store the information that was collected and to define relationships between the various pieces of data. However, in such cases the data must first be entered into the database, which allows the possibility of input error and thus inaccurate data. Further, decisions still have to be made as to how to process the data into records, as well as what links should be made to tie the data together, which may lead to further input error. Such data entry and record and link creation is also often time consuming and inefficient.

Some attempts have been made to try to bring portable technology to the inspection process. For example, some database-driven applications have been made available on PDAs or other smart phones. Such solutions have generally been targeted at experienced and specialized inspectors who have acquired the knowledge needed to navigate through the various data-centric procedures involved in each application, which are often cumbersome and non-intuitive to one not trained in their use.

The existing solutions generally do not provide for conducting an inspection of an asset at a remote site using a mobile device that uses various functions of the mobile device to allow for the collection of all of the necessary data, instead of requiring multiple pieces of hardware. Further, none of the existing solutions provide a structured solution that allow for easy use by both seasoned specialist inspectors and inexperienced novice users alike, or for standardized data or reports.

SUMMARY OF THE INVENTION

A computer-implemented method for inspecting a physical asset using a mobile computing device is disclosed. In one embodiment, the method comprises the steps of providing on a mobile computing device a graphical user interface indicating a plurality of pre-defined elements of the asset to be inspected and a plurality of types of data that may be entered, and for entering data in predefined fields in formats appropriate to each element and type of data; receiving via the graphical user interface a selection of one or more of the plurality of pre-defined elements of the asset to be inspected; receiving via the graphical user interface one or more of the plurality of types of data for each selected element; automatically annotating the received data with the current time and the geolocation of the mobile computing device; transmitting the received selection and annotated data to a server; and storing the received selection and annotated data on the server in a manner in which they may, not be modified, thereby creating an audit trail of the received selection and annotated data.

In one embodiment, the graphical user interface further indicates a plurality of pre-defined types of assets, and the method further comprises receiving via the graphical user interface a selection of one of the plurality of pre-defined types of assets to be inspected.

In various embodiments, the geo-location of the mobile computing device is determined with a GPS application in the mobile computing device, or is received from a cellular network.

In various embodiments, the plurality of types of data that may be include text, photographs, images, video, audio, or other desired data types.

In one embodiment, the asset is a building or a unit within a building, and the pre-defined elements are spaces within the unit or building.

In various embodiments, the mobile device may be a smart phone, such as an iPhone® device from Apple Inc. (or the similar iTouch® device), a Blackberry® device from Research Ltd., a device using the Android® operating system from Google Inc., or a laptop, notebook or netbook computer, or a "tablet" device such as an iPad® device from Apple Inc. The mobile device may have a camera which provides the ability to take photographs or video, a microphone for capturing audio, and/or GPS or telemetry capabilities.

In various embodiments, a report on the condition of the asset is automatically generated from the received selection and annotated data stored on the server. The report may comprise a printed document, or a web page viewable in a browser window.

In another embodiment, additional data regarding the asset is collected in a similar fashion at a later time. In some embodiments, a report may be generated showing any change between the first data and the additional data that indicates a change in the condition of the asset between the time the first data is received and the additional data is received.

DETAILED DESCRIPTION OF THE INVENTION

Figure 1:
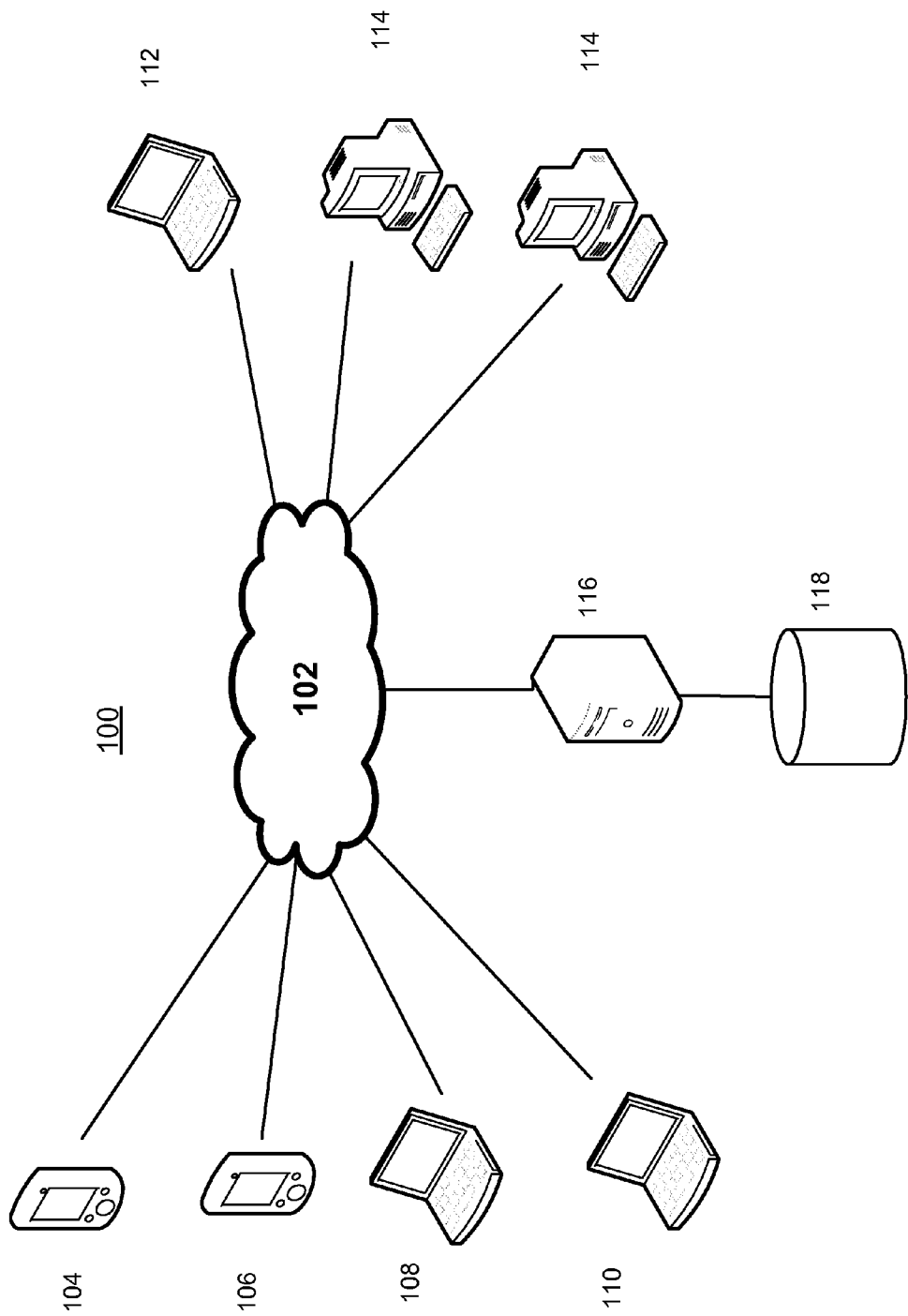
FIG. 1 is an illustration of a network environment in which the present invention may be used.

The present application describes a method and system for evaluating an asset that seeks to improve on the solutions of the prior art. The invention is intended to provide a structured, intuitive and coordinated solution for the secure collection of information about a physical asset. As above, an asset may be any physical item, such as a house or other building, or a unit within the building, vehicle, painting or other artwork, etc.

While the examples herein will generally be directed at a house or building, or a unit within a building, this is not intended to limit the scope of the invention, which is defined only by the claims.

In one embodiment, a system according to the present invention has two main hardware components, a mobile device that allows for the collection of information in the field, and a central server where the information is stored and processed, and then made available for review, reporting, or further interaction as described herein. Software on the mobile device provides an interface which guides the user through a structured series of selections from preset alternatives that guide the process of collecting information about the asset being inspected, and the types of data collected, so that the user may proceed in a guided and efficient manner. Where necessary, a user may define new alternatives. As any particular piece of information is collected, it is cross-correlated to the other information collected by the mobile application, and saved to a memory in the mobile device. The data may be annotated with the current time, date and/or geo-location of the mobile device.

As the data is collected, or after collection is complete, the mobile device sends the data and the selections associated with the data to a server having a program that is adapted to receive and process data from the program on the mobile device when an appropriate connection is available. The data and associated, selections are preferably stored in a read-only format that insures the immutability of the data and creates a secure audit trail of the process used to collect the data, since every step of the collection process and the resulting data may be verified. The data may be used to automatically generate reports by populating predefined forms having fields that are suitable for presenting the collected data. In some embodiments, reports may be prepared that compare the condition of the asset over time or document the audit trail of all of the actions taken and data entered during an inspection. These reports may similarly be generated automatically by the use of predefined forms. In addition, the data and reports may be made available for viewing, adding comments and/or printing, for example via an Internet browser, and for collaboration among users.

A system or method according to the present invention will preferably make use of the integrated functionality of a mobile device to replace many of the tools that a user previously needed to perform an inspection. For example, paper based notes may be replaced either by allowing text input into a program, or by making entries on displays of intuitive lists using single touch selection via the device's touch screen (or, in the absence of a touch screen, single click if a pointing device is available). A still or video camera and dictating machine may be replaced by a mobile device's built-in camera and microphone. Location and orientation information may be captured automatically without user input by using a device's internal GPS, gyroscope, accelerometer or other sensory inputs, or by receiving information from, for example, the cellular network or a wi-fi network. In one embodiment, the mobile device is an iPhone® or iTouch®, which has all of the described hardware functionality. Other notebook or netbook computers, or "tablet" devices such as the iPad®, may be used in other embodiments.

In an embodiment of the present invention, a software application on the mobile device performs a process that allows a structured workflow which is applicable to the particular type of asset being inspected. This structured approach may for example present the user with a set of elements of the asset that are generally expected to be present, and allow the user to enter data regarding each element, decide that a presented element is not applicable or not to be inspected, or define additional elements of the asset. This approach is designed to walk a user through an inspection in an order that ensures capture of all of the salient information necessary for the asset in an efficient and coordinated manner. Such a guided approach may be designed to allow even an inexperienced user to complete an inspection process with speed and confidence by being routed through a workflow pattern similar to that which an inspector with specialized training might adopt when performing the same work.

While such an application is intended to make it possible for a user without specialized training to conduct an inspection, using a software application with this structured approach may also provide benefits for a trained inspector. For example, the application may provide greater efficiency in the performance of an inspection because of the speed with which data is captured. In some embodiments, the data may be automatically linked together with appropriate relationship information for additional gains in efficiency and accuracy; for example, in inspecting multiple units in a single building, it may be appropriate to indicate that each unit contains the same elements, and to insure that each element is inspected, or to define common elements that apply to each unit, such as exterior walls or public spaces. Further, a predefined structure may provide a disciplined process that helps the inspector avoid missing an observation and standardize data collection.

In some embodiments, during the inspection process the user may be provided with feedback about the amount and/or type of information that is being collected to help the user determine how the amount and type of collected data correlates with the amount and type of data that would normally be expected for an inspection of type currently being performed. This may be achieved by the application identifying the type and amount of collected data and comparing it against the typical characteristics of the type of asset being inspected, or against a typical data set for such an asset. A score may be derived and displayed to the user. Using this score, the user can then decide whether to collect more information to improve the rating, or ignore the feedback and proceed as the user desires.

As information is collected on the mobile device, it is typically organized into sequential packets of data and stored temporarily on the local memory in the device. In some embodiments, when suitable connectivity to the Internet is available, the data packets are sent over the internet to a server that has a custom API (application programming interface) which receives the packets. The API then processes the data packets into a defined sequence and saves the data to a non-volatile memory on the server or elsewhere, for example, a hard disk, flash memory, CD-ROM, or any other desired type of "permanent" memory. Once the inspection information has been processed by the API and stored, it may be available for viewing through any Internet web browser, or another application.

Because the information has been collected on the mobile device in a structured manner, the server may automatically organize the data into an associated structured report format and either print a report or provide it as a web page viewable in a browser window. The mobile device may also transfer all of the metadata associated with the collected information to allow for a comprehensive audit trail which permits a review of the actions that were performed during the inspection process. Such meta-data may include, for example, a date and/or time stamp or geo-location associated with the data. The metadata may be saved in a read-only state to prevent editing, which provides immutable evidence of the validity of the information collected. The data collected during the inspection may also be saved in a read-only state to ensure that none of the photographs, video, audio or other representations of the asset that were recorded are tampered with or manipulated in any way.

In some embodiments, it may be desirable to perform more than one inspection of an asset at different times; this will result in different sets of data about a single asset. Where more than one set of data is available, the structured manner in which the data is recorded allows for automatic comparative reports to be generated. The various attributes recorded about the asset may be compared from one inspection to another and a report generated indicating any changes in the recorded condition of the asset.

FIG. 1 shows a network environment 100 in which the present invention may be used. Mobile devices such as smartphones 104 and 106 and notebook or netbook computers 108 and 110 are connected to a wide-area network 102, such as the internet. Other computers such as notebook or netbook computer 112 and desktop computers 114 are also connected to network 102, as is server 116, which is also connected to storage memory device 118. Again, storage memory device 118 may be any non-volatile storage device, including, but not limited to, a hard disk, flash drive, CD-ROM or DVD device, etc.

A user inspecting an asset collects data using a mobile device, for example a smartphone or computer shown at 104-110. The collected data is transferred across network 102 to server 116 for processing and storage in a read-only format in storage device 118. Once the data has been processed, access to the data may be permitted to users at remote computers 112 and 114, for example via web browsers on those computers.

Figure 2:
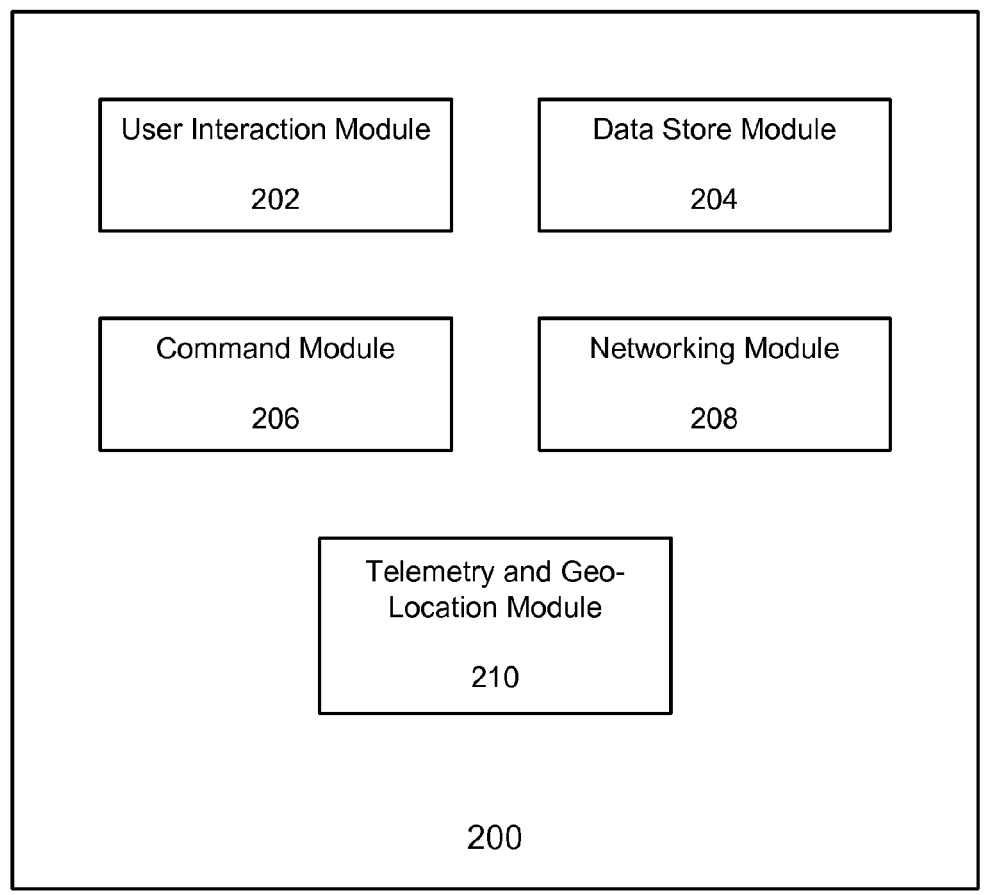
FIG. 2 is a block diagram showing hardware and software modules that may be present in a user device according to one embodiment of the present invention.

FIG. 2 shows a block diagram of some of the software modules that may be present in a mobile application on a user device, such as a smartphone 104 or 106 or laptop 108 or 110, used for collecting data on an asset. In some embodiments these may include a user interaction module 202, a data store module 204, a command module 206, a networking module 208, and a telemetry and geo-location module 210.

The user interaction module 202 accepts user commands from the mobile device's user interface, both to input data for processing by other modules as well as to display different portions of the user interface based on the specific user action. A user action may result in the addition of meta- or primary data about an asset, observations in the form of text, a photographic image or visual annotation, audio or voice, video, or other information. Inputs from user actions may be combined with inputs from the geo-location module 212 as discussed herein, and then formatted and saved by the data store module 204 and translated into new date, or data changes, by the command module 208. The networking module 210 monitors and transmits such new data or data changes to the network API server, such as server 116.

The data store module 204 formats the data collected through use of the mobile application and saves it to the local non-volatile memory in the mobile device. The saved data is thus preserved if the mobile application is interrupted, for example if the application is exited either intentionally or by accident, or the device is shut down. The data store module 204 defines and manages the format of the data, and also services requests from other modules to save, modify, or delete data.

User activity on the mobile device is monitored by the command module 206. When a user desires to create a new piece of data or effect a data change, an action by the user typically causes one or more commands to be generated by the command module 206 and stored by the data module 204.

Each such command includes the data necessary to create, or perform the change in, the data, transmit the data or change to the server, and recreate the data or change on the server. Data provided by the user about an asset such as condition ratings, text annotations, photographs, video, audio, etc., may be combined with data indicating the current time and the location of the mobile device that is obtained from the geo-location module 210 when generating commands.

The networking module 208 is responsible for communicating with the server 116; data and commands are transmitted to and received from the server. The networking module 208 retrieves data entered by the data store module 204 and commands generated by the command module 206, organizes the data and commands into API (application programming interface) requests and transmits the API requests to the server so that the server receives a complete record of the commands and data entered into the mobile device by the user.

The networking module 208 also monitors the availability of the network, and whether the server is able to be contacted. If the network or the server is not available, networking module 208 will preferably automatically reconnect when the network becomes available. Data and commands which could not previously be sent due to network or server unavailability will be held and automatically batched in subsequent API requests to reduce network communication overhead and maximize the efficient use of available network resources.

In some embodiments, the networking module 208 defines and maintains two network transmission pipelines between the mobile device and the server. A data and command pipeline transmits API requests optimized for large amounts of fine-grained data such as condition ratings and text annotations. A separate command payload pipeline transmits API requests optimized for course-grained data such as photographic image data, video, and audio.

The networking module 208 may encode an API version key in all API requests. In such a case, the particular protocol, data structure, data format, and data values of network API requests will conform to a pre-defined version of the network API represented by the API version key. The API version key is then used by the server to support network API changes across different versions of the API used in deployed network API clients.

The telemetry and geo-location module 210 makes telemetry and geo-location data available as part of the collected data. Geo-location data may include such information as latitude, longitude, altitude, and horizontal and/or vertical accuracy for a given location of an asset when data about the asset is entered, and may be attached to other data and/or used by other modules. The geo-location data is typically collected from one or more location services available on the mobile device, such as from a GPS unit, triangulation, compass, etc., and then parsed, structured, and stored for use by the mobile application.

Location data may at times be unavailable due to issues such as device location service errors, or user settings which disable the device location service. If desired, the telemetry and geo-location module 210 may also monitor location data availability and may distinguish between known scenarios where location data is unavailable. The telemetry and geo-location module 210 may also track location data over time and may respond to requests for location data as well as accuracy information about the location data.

The telemetry data may be made available from a variety of mobile device components, for example, an accelerometer, magnetometer, and/or gyroscope. When telemetry data for a mobile device is available, the telemetry portion of the telemetry and geo-location module 210 tracks the telemetry data. The mobile application may optionally prompt the user through a calibration process to fix the device orientation to a known reference point relative to the asset being observed. Once the device is calibrated, the telemetry data may be used to determine and store the distance, speed, and direction of movement of the device in real time, providing objective instrument observations which may be used to supplement the user-generated observations.

Figure 3:
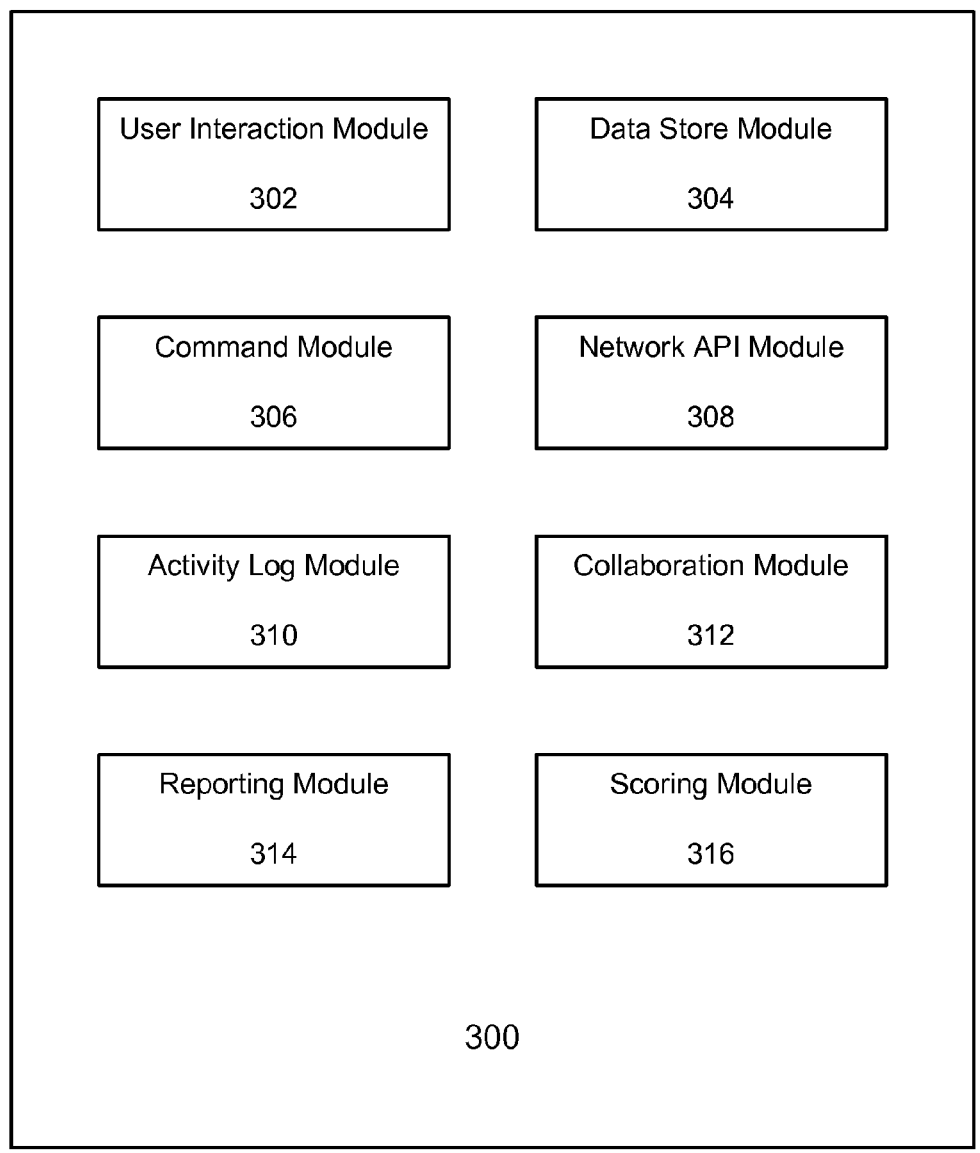
FIG. 3 is a block diagram showing hardware and software modules that may be present in a server device according to one embodiment of the present invention.

FIG. 3 shows a block diagram of some of the hardware and software modules that may be present in a server device, such as a server 116, which receives, processes and stores data regarding an asset that has been collected by a mobile device. In some embodiments these may include a user interaction module 302, data store module 304, command module 306, network API module 308, activity log module 310, collaboration module 312, reporting module 314 and scoring module 316.

The user interaction module 302 displays a user interface on a mobile device or other computer that are accessing the server and responds to user actions received through the interface. For example, a user action may cause the collecting of input data for processing by other server modules, or the altering of the user interface based on the specific user action. A user action may result in data state changes such as the addition of meta- or primary data about an asset. The data is received by the network API module 308, and the inputs are then structured and saved by the data store module 304 and translated into data state changes by the command module 306.

Data store module 304 reliably and securely saves the data submitted to the network API module 308 by the mobile application as well as system-generated metadata; it may also store user inputs received by user interaction module 302 from a user accessing the server from a web browser. In one embodiment, the data is stored in a read-only format so that it may not be modified or deleted, although the entry of additional data may be permitted.

Data store module 304 also processes requests to view data, responding with the requested data if permitted by the requestor's access privileges, and requests to add, modify or remove data; data store module 304 may permit or deny such requests based on access controls or pre-defined data rules. Where a series of data accesses is necessary to fulfill a single request, data store module 304 controls the access process. Data store module 304 may if desired contain submodules that may be invoked to handle specialized storage formats such as audio, video, images, graphics, and full text documents.

Data store module 304 may use a data model that structures data as entities composed of a collection of attributes, with each attribute having a data type and one or more optional associations to other entities. The data model can be extended to include new entities, attributes, data types, and associations. In addition to providing the structure of field observations and web application data, the data model also encompasses the system data necessary to manage the platform, including, for example, user registrations, user access, scheduled jobs, and user notifications, and to create new features and turn features on and off.

The command module 306 processes commands received from any of the outstanding mobile applications by validating the command structure and data, executing valid commands to effect data state changes in the data model, and sending commands and data to the data store module 304 for storage. Commands may be given a sequence key to place them in sequence relative to commands which were generated before as well as after a given command. The command module 306 ensures each command is generated, stored, and retrieved according to this sequencing. Combined with the command data, the command sequence is used to reliably perform data state changes on the mobile device and on the server.

The network API module 308 receives network API requests from client mobile applications. Each API request is processed and a response is returned with an acknowledgement, requested data, or diagnostic data in the event of malformed, illegal, or invalid requests. Commands are extracted from network API requests and submitted to the command module 306 for processing. The API module 308 defines the network API versions that are supported and can respond to requested API version requests. In addition, the API module 308 may verify that incoming network API requests conform to a support network API version.

The activity log module 310 creates an activity log which captures, stores and displays activity associated with the creation, updating, and reporting of data from an inspection, as well as any collaboration by users as described elsewhere herein. The activity log module 310 assembles commands and integrates them with server activity and data provided by the collaboration module 312 and reporting modules 314. The resulting data set contains a series of entries, each of which has an "actor" who initiated the activity (either a user or a system API), an activity identifier and label, a timestamp, a reference to the asset involved in the activity, and a reference to the inspection in which the activity was performed. As a whole, these activity logs thus represent a source record of the entire history of an inspection, including the structure and order of assembly of the inspection and the spaces and items that were examined, all on-site observations, and any subsequent web-based annotations, publications, sharing, comments, group editing activities, and/or comparison reporting actions.

In addition to storing and displaying activity performed by actors on each asset or component thereof in the system, the activity log module also performs as a recording of the entire set of activities. Thus, the system can utilize the activity log as a method of "playing back" some or all activities, for example, all activities from the start of an inspection until a specific point in time). By doing so, it is possible to re-create the inspection data to a desired state, such as the inspection as of a specific point in time. This re-created inspection can then be compared with data stored in a different system, or data stored in the server itself, such as a condition report on the condition of an asset, to ensure that the data stored internally or in another system has not been tampered with.

The collaboration module 312 allows collaboration among users regarding assets. It receives, stores, routes and manages data regarding the sharing and group editing of inspections and condition and comparison reports. The collaboration module 312 receives requests for the sharing of data (including inspections and reports) initiated by the owners or co-owners of the data and grants permission to view, comment, share, edit and delete the data to other individuals where appropriate. The collaboration module 312 detects whether an individual named in a sharing request is an existing user and if so, grants the privileges requested by the share to that user. If not, the collaboration module 312 may create an invitation to become a user. The invitation typically contains a token that references the share request and grants access to the object when the invitation is accepted by the named individual.

The collaboration module 312 also controls the types of interactions that are allowed on data by collaborators. The permitted types of interactions may include, for example, the viewing of data regarding assets, commenting on assets or their component parts, comparing two or more assets or elements, the addition and removal of component parts of the objects, such as adding an element or data regarding an asset or element, the sharing of data to additional individuals, and other types of interaction as desired.

Thus, for example, when the type of collaboration is a comment by a user, the collaboration module 312 receives, stores and displays the comment. Such comments may contain notes generated by the user, as well as a timestamp, a reference to the user that made the comment, and the asset or element referenced by the comment. The comments made on an asset that is the subject of collaboration form a stream that may be saved and displayed by the module. All collaboration, regardless of type (e.g. sharing, co-ownership or commenting) is also logged by the activity log module 310.

The reporting module 314 can re-create the current state of an inspection by replaying all of the events stored in the activity log and comparing the resulting state of the inspection with the saved state to ensure that no tampering has occurred. A condition report may be prepared that contains all of the user-entered observations along with the complete structure of the inspection, the various elements thereof, and all of the meta-data related to the inspection at the time of the snapshot. The reporting module 314 can also compare multiple condition reports in the form of comparison reports.

The reporting module 314 creates a report by saving the current state of an inspection, as reflected by the activity log module 310. If the data store module 304 has stored the data in a read-only format, then the portion of the report represented by the existing data will likewise be immutable. That is, subsequent reports on the asset will be the same unless additional data has been entered regarding the asset, in which case the reports will be extended, but the prior portion of such a report will not change.

The reports created and saved by the reporting module 314 are available for use by the collaboration module 312 and can be recombined further by reporting module 314 for comparison and additional collaboration in the form of comparison reports. This recombination can occur between two or more condition reports derived from multiple inspections of a single asset, such as an initial inspection and an updated inspection, or two or more more reports derived from inspections of different assets, such as one two-bedroom apartment to another.

When a comparison is attempted between two assets that are unlike or only partially-alike, such as a one-bedroom apartment and a two-bedroom apartment, a semi-automated disambiguation sub-module (not shown) may be implemented to assist in creating the comparison. Such a disambiguation sub-module takes two reports of unlike or somewhat similar inspections and, by using information about the elements within each inspection, including each element's type and the order each was added to the inspection, suggests a matching between each element of the condition report of one inspection and each element of the other inspection.

The disambiguation sub-module then facilities manual disambiguation and relating of unlike elements within compared condition reports by direct user interaction. This results in only appropriate direct linking of possibly unlike elements and the un-linking of potentially similar elements to create the comparison report sought by the user. When two or more condition reports are combined by the module into a comparison report, the reporting module 314 stores and displays the combined report with the desired relationships between elements. Each report that is created is logged as an activity by the activity log module 310 and is then available for use by the collaboration module 312 for further enhancement.

An optional scoring module 316 may be used to provide a measure of the completeness of an inspection in the form of an abstract "score" based upon an algorithm that takes into account both whether the inspection is complete, and the quality of observations in the inspection. The score is intended to represent the quality of individual observations as well as the quality of the structure of the inspection, i.e., whether all of the elements of an asset have been inspected.

In one embodiment, the scoring module 316 compares the data entered in an inspection to an "ideal" set of data. Thus, in the case of an apartment inspection, the scoring module will compare the data entered to see if data has been entered regarding all of the expected elements (all of the rooms, kitchen appliances, etc.), and give a greater score if such data is present. In another embodiment, the scoring module 316 compares the data to a "minimum acceptable" set of data.

The quality of an observation may take into account the detail of the primary data entered by the user performing the inspection, as well as any meta-data accompanying the underlying user-entered "primary" data. It may also take into account how much time has elapsed between observations, and entries of primary data close in time given greater weight than those spread out over long periods of time. This encourages completion of an inspection in a shorter period of time.

The scoring module may also provide a greater score for any subsequent activities deemed desirable, for example the actual creation of a condition report, the sharing of a report via the collaboration module 312, the addition of comments by other users, etc. A system administrator may create and tune the scoring algorithm as desired. In general, the scoring algorithm is arbitrary, and various such algorithms will be apparent to those of skill in the art.

Figure 4:
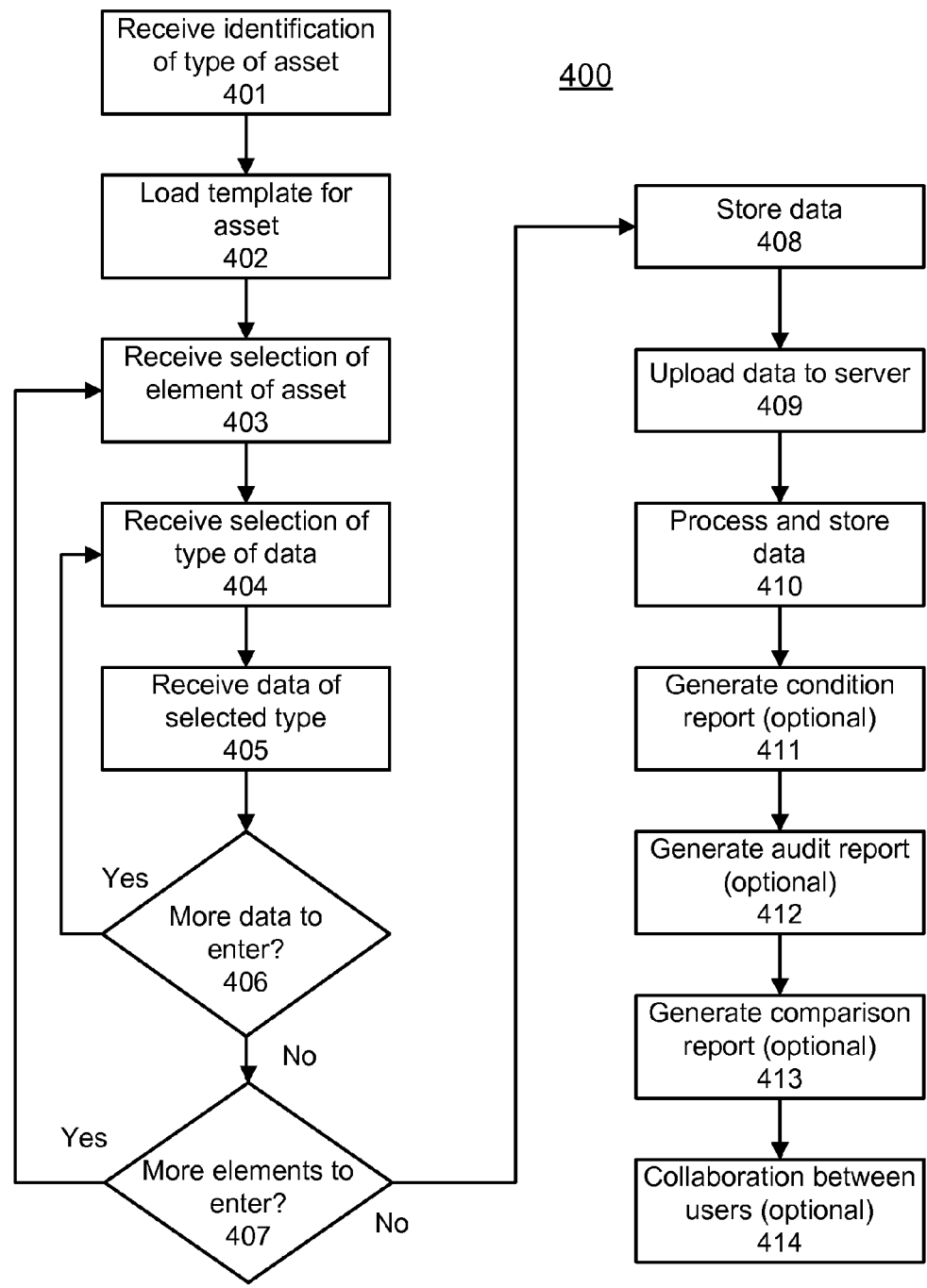
FIG. 4 is a flowchart of a simplified version of a process of inspecting an asset according to one embodiment of the present invention.

FIG. 4 is a flowchart of a simplified version of a process 400 for inspecting an asset according to one embodiment of the present invention. It is assumed here that the mobile application has already been installed on the mobile device; for example, in the case of an iPhone® device from Apple Inc., the mobile application is downloaded from the iTunes® store run by Apple.

In step 401, identification of the type of asset to be inspected is received by the mobile application. The asset may be, for example, a house or building (or a particular unit or portion of a building), a car, a piece of fine art, etc. In some embodiments, the type of asset is selected by the user from a list or menu presented to the user on the mobile device, for example by clicking on the desired type of asset. (If the application is limited to a single type of asset, then this step is omitted.)

In step 402, a template for the type of asset identified is loaded. In some embodiments, the template will, for example, comprise a series of screens to be displayed on the mobile device to provide structure and guide the user through the inspection process by prompting the user to perform certain actions as in the following steps. The screens may contain written directions, and/or may include menus or items that the user may touch or click upon to make choices. For example, where the asset is a building or a portion thereof, the application may provide a list of expected elements, such as rooms or other spaces, to be inspected as will be seen below.

Next, in step 403 the application receives a selection of an element of the asset about which data is to be entered. For example, if the asset is a building or a portion thereof, a specific room may be selected as an element. A screen for allowing selection by the user of an element may permit the entry of text, or the selection of one of a number of presented options as will be described below.

In step 404, the application receives an indication of the type of data to be entered. For example, the user may indicate that he or she intends to enter text, a photograph, audio, video, etc. This permits the mobile application to determine an appropriate format in which to store the incoming data. Again, the user may be permitted to enter text indicating the type of data, or may be able to touch or click upon an item on the screen to so indicate. Alternatively, the application may determine the type of data to be entered from the feature of the mobile device engaged by the user to enter data; thus, if the camera is activated, this indicates to the application that the data is a photograph or video.

Next, the application receives data at step 405, i.e., records the desired text entered on the keyboard, takes a photograph or video, records a voice memo or other audio, etc., as entered by the user. There will generally be some indication that the data entry is complete. In the case of a photograph, for example, the taking of the photograph will itself indicate that the entry of that data is complete. In other cases, such as text entry, audio or video, the user may indicate that the data entry is complete, for example, by clicking on a box or selecting a menu entry, or by selecting another type of data entry.

The data may be annotated with meta-data such as the current time, date and/or geo-location of the mobile device. The time and/or date may be obtained from a clock in the mobile device, or from an external source, such as the cellular network or a server accessible over the internet. The geo-location may be obtained from the mobile device if it has the functionality to determine its geo-location, such as a GPS application. Alternatively, some smart phones may have their location determined by the cellular network through which they communicate. In some instances, a mobile device having wi-fi capability may have its location provided by a wi-fi network with which the mobile device is communicating.

Once the data is entered, the application may provide a prompt to the user at step 406 inquiring whether there is more data to be entered about the selected element. Alternatively, the application may simply return the user to a previous screen at which the user may indicate that data is to be entered about the current element. If the user desires to enter more data about the current element, the user so indicates and the application returns to steps 304 and 305 to allow the user to select the type of data to be entered and to enter the data as above.

If the user indicates that there is no more data to be entered about the element, the application may next inquire at step 407 whether there are other elements about which the user wishes to enter data, or may return the user to the screen at which an element is selected. If the user wishes to select another element, again an indication of such is generally made by clicking a box or selecting a menu entry. In this case, the application returns to steps 403 to 405 to first allow the user to select the next element, and then to select the type of data to be entered and enter the data as above. These steps repeat until the user has selected all of the desired elements, and entered all of the desired data.

In some embodiments, the application may store the entered data in the non-volatile memory of the mobile device at the time the data is entered at step 405. Such a process limits the loss of already collected data if the application is interrupted for some reason, such as a loss of power to the mobile device or accidental exiting of the application. If the entered data has not yet been stored in the non-volatile memory, once the user indicates that there are no more elements to be inspected, the data is stored at step 408.

In one embodiment, the mobile application may upload each item of entered data to the server, such as server 116, at any time a connection is available after the item is entered in the mobile device. If any data has not yet been uploaded to the server, or if, in an alternative embodiment, the data is not uploaded until all of the data is entered in the mobile device, at step 409 the mobile application uploads the remaining or completed data to the server when a network connection is available as described above.

In one embodiment, data stored in the mobile device that has not been uploaded to the server may still be modified by the user, while in another embodiment such data may be stored in a read-only format so that it may not be modified. Such storage in a read-only format may either be done automatically or may be selectable by the user in different embodiments.

At step 410, the data is processed by the server and stored in a read-only format in a non-volatile memory accessible to the server, such as memory device 118 in FIG. 1.

Once the data is processed and stored by the server, several optional steps are possible. At step 411, a condition report may be generated from the collected data if desired. Since the types of data were determined when the data was collected, it will generally be possible to provide a report template suitable for presenting the data so that the report may be generated automatically, rather than requiring a person to prepare it. A report may be prepared in the form of a web page, viewable in a browser window, or alternatively may be printed (With some obvious limitations on how some types of data may appear in print, such as audio and video).

At step 412, an audit report indicating all of the procedures used in collecting the data regarding an asset may be prepared. At step 413, a comparison report indicating the changes in condition of an asset between two inspections of the asset may be created. Similar templates may be used for the audit report and comparison report. Collaboration between users may be permitted at step 414; for example, various users may be permitted to access the data on an asset, add data, make comments, share the data with other users, etc.

FIGS. 5A to 5J show a set of screen displays that might appear on a mobile device, such as an iPhone® device from Apple Inc., during the use of a mobile application to conduct an inspection in one embodiment of the invention. This example shows an embodiment with a template that is appropriate for a house or apartment, and is expected to be used on an iPhone®, and the description thus refers to the virtual keyboard and touchscreen capabilities of that device. However, again similar applications may be implemented for other types of buildings, or non-building assets, and for other mobile devices without these functions, and instead using the different capabilities of those devices, such as actual keyboards and pointing devices, without departing from the spirit of the present invention, which is defined solely by the claims.

Figures 5A, 5B:
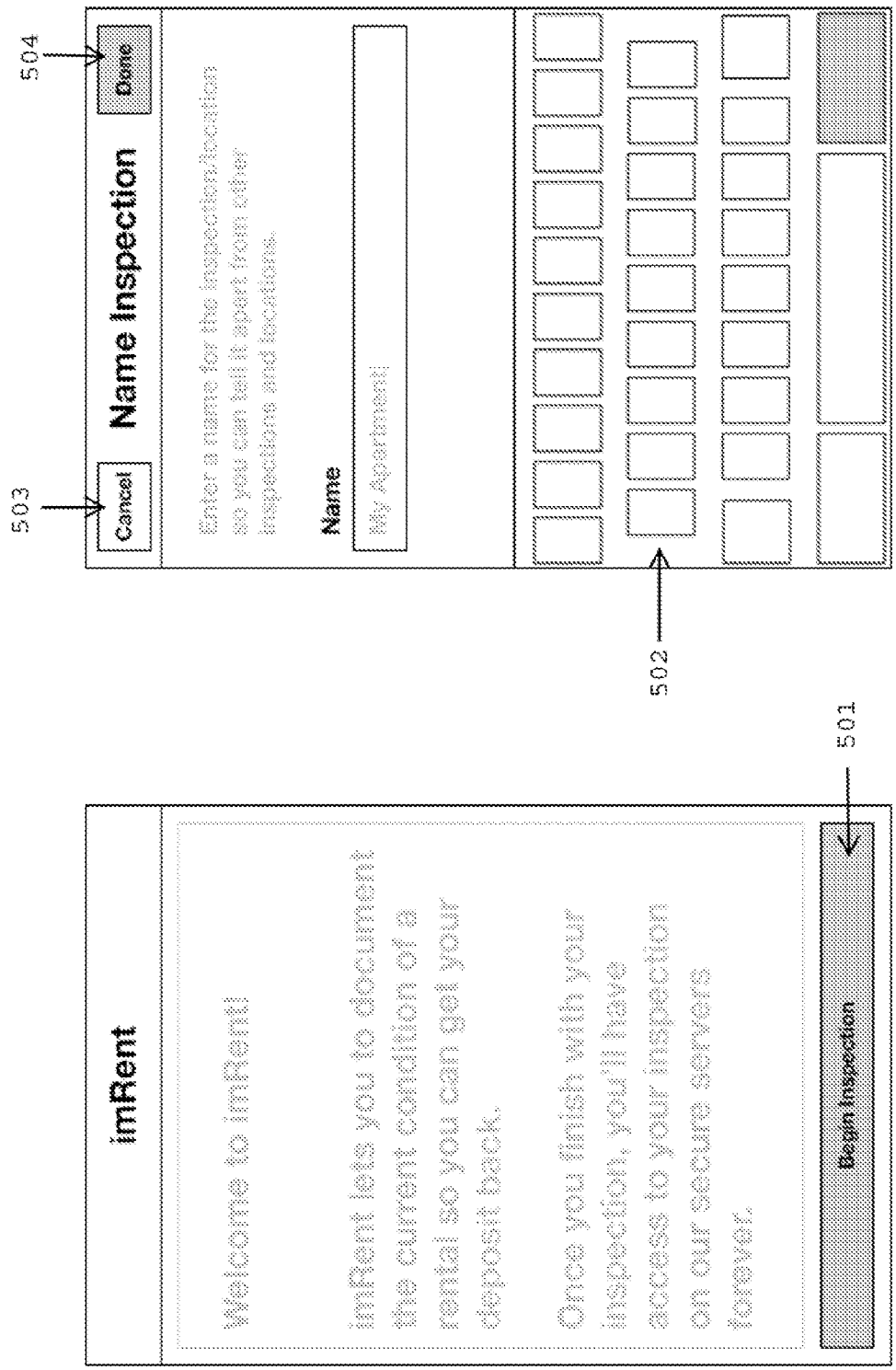
FIGS. 5A to 5K are screen displays that might appear on a mobile device during the use of a mobile application to conduct an inspection in one embodiment of the present invention.

FIG. 5A is a screen that might appear the first time the application is run after installation on the mobile device. When the user of the mobile device "taps," i.e., touches the "Begin Inspection" bar 501 on FIG. 5A, the screen of FIG. 5B may appear. This invites the user to name an inspection, entering characters on the virtual keyboard 502 of the iPhone®, and thereby creating the inspection. In this illustration, the user has named the inspection "My Apartment." As is common in iPhone® and other computer applications, there is a "Cancel" button 503 which takes the user back to the prior screen, and a "Done" button 504 which will take the user forward to the next step in the process.

The name of the inspection should be selected to differentiate the current inspection from any other inspections. Thus, a property manager conducting a number of inspections of different apartments would not choose "My Apartment" as an inspection name, but might, for example, choose "Apartment #101," "Apartment #102," etc. If desired, the mobile application may provide a default name, or use the last entered name as a default, but the user should have the option to change the name to whatever is desired.

Each action taken in the mobile application generates a corresponding command that is sent to the server either concurrently or at a later time, which records the actions taken on the mobile device on the server. Thus, creating a new inspection and providing a name creates a command to the server such as "add_inspection" which results in the creation of a new inspection data set on the server having the indicated name. Other actions described below will similarly generate instructions that allow the server to record the inspection process and data, and later replicate it for audit purposes.

Figures 5C, 5D:
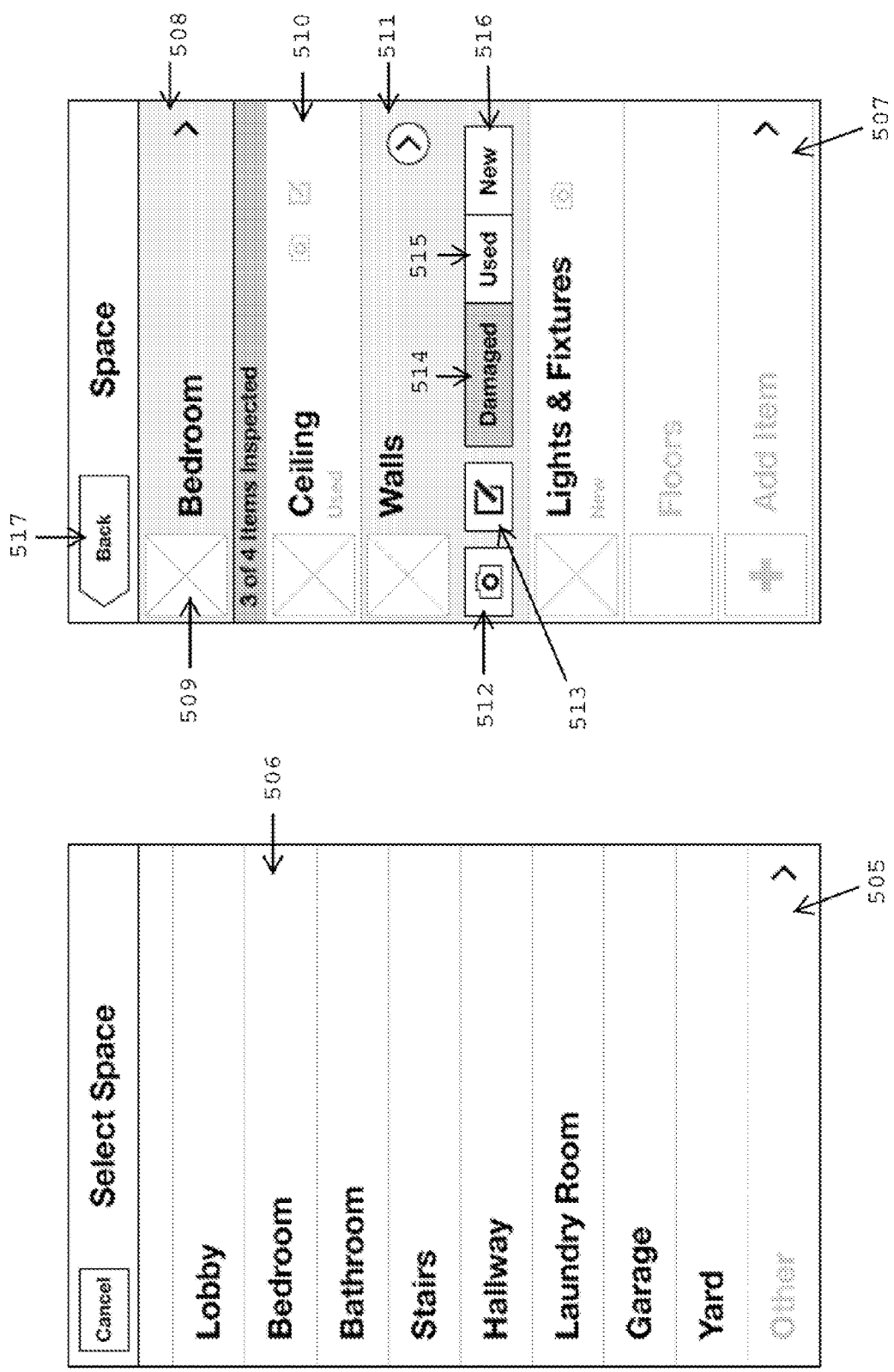

When the user taps the "Done" bar 504 on FIG. 5B, the screen of FIG. 5C may appear. This screen lists a number of elements that have been previously selected for inclusion in the application as potentially appropriate for the indicated type of inspection, in this case "space" types such as rooms or areas that may be expected to be present in an apartment. The list may contain elements that will not be present in every instance; for example, not all apartments have a lobby, a garage or a yard. The user may also be presented with the ability to define an element, or space, which is not on the list by tapping the entry "Other" 505. It will generally be advantageous to provide such an ability to add elements not in the template in most situations, since it may not be possible to anticipate all of the elements that may arise during an inspection.

The user's tapping one of the listed elements is a "selection," and causes the mobile application to receive that selection, as in step 403 on FIG. 4. Here, tapping "Bedroom" 506 to select it may bring up the screen of FIG. 5D. This screen provides both a template which allows the user to enter data about a bedroom, as well as a summary of any data already entered. Again, the screen of FIG. 5D provides a number of "items" or sub-elements that may be expected to be present in the selected element. Thus, a bedroom is expected to have a ceiling, walls, lights and fixtures, and a floor. Also, the user is again able to select "Add Item" 507 if it is desirable to add something that is not in the template, as explained below.

The summary cell "Bedroom" 508 at the top of the screen of FIG. 5D provides a thumbnail version of any photograph selected for the summary, and may indicate whether there are any notes for the space in general. (Photographs would be shown in the boxes on the left of the screen; in this instance, an "x" in box 509 indicates that no photograph has been taken or designated for this box.) Similarly, each item, or sub-element, within the space has an entry that shows a photograph, if taken and selected, and any notes, such as "Used" under "Ceiling" in box 510.

The application may expand the portion of the screen regarding an item that is tapped once by a user, such as is shown by "Walls" 511 in FIG. 5D, and provide touch buttons to take a photograph, indicated by the camera icon 512, or enter a note, indicated by a text box icon 513. The expanded display may further permit the user to quickly enter one of several notes, such as shown by the boxes "Damaged" 514, "Used" 515, and "New" 516, or any other choices displayed by the application, by tapping on the desired box. It can be seen that in the screen of FIG. 5D, the user has chosen to indicate the condition of the walls as "Damaged," and the condition of the ceiling as "Used." These condition ratings may be color coded, for example using green for New, yellow for Used, and red for Damaged, if desired. Alternatively, a slider bar could be used to allow the user to select "New," "Used" or "Damaged," or to select a condition rating for the item on, for example, a one-to-five or one-to-ten point scale. A "Back" button 517 will again take the user back to the prior screen.

Tapping an item twice may "open" the item and take the user to another screen which allows more actions. For example, double-tapping on "Walls" 511 in FIG. 5D might result in the screen of FIG. 5E, which summarizes the data relating to the walls of the apartment being inspected. As shown, some data has been entered, i.e., the text in box 518; if no data has been entered, there will be no text. Again, boxes 519 near the camera icon 520 are available for presenting thumbnail images of any photographs taken of the walls. Again, the user may be able to select the condition of the walls by, for example, tapping the box "Damaged" 521 on this screen as well as that of FIG. 5D; regardless of whether it is selected on the screen of FIG. 5D or 5E, the "Damaged" box appears as selected on both screens.

Figures 5E, 5F:
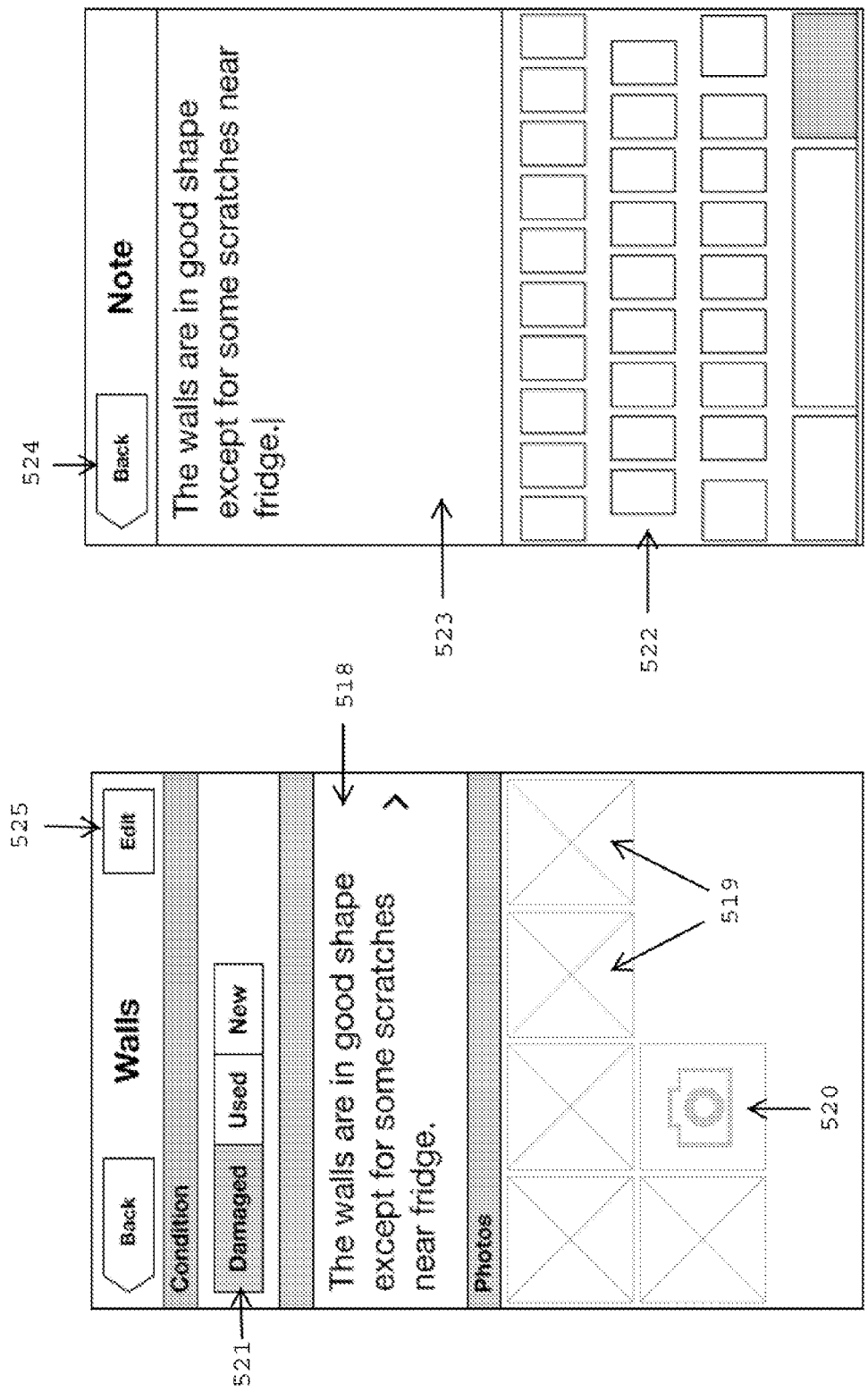

To enter the text shown on FIG. 5E, the user double-taps on the text cell 518 to obtain the text entry screen of FIG. 5F, which again provides a virtual keyboard 522 that allows the user to make the desired notations. The entered text appears in box 523. When done, the user taps "Back" button 524 to return to the screen of FIG. 5E, which will now show the entered text, or as much of it as will fit in the text window 518; the mobile application may, for example, show "(more)" or " . . . " at the end of the text window to indicate that some of the text is not displayed on the screen of FIG. 5E.

Tapping on the camera icon 520 in the screen of FIG. 5E will take the user to a screen such as that shown in FIG. 5C, which calls the mobile device's camera function. Tapping on the camera icon 522 in the screen of FIG. 5G takes a photograph, and brings up a screen such as that shown in FIG. 5H, which will display the photograph if one is taken, and any desired and available meta-data. As illustrated here, such meta-data includes the time and date the photograph was taken, obtained from the mobile device's clock or otherwise reported by a service provider, and the geographical location at which the photograph was taken, taken from the mobile device's GPS unit and attached to the photograph by the telemetry and geo-location module 210.

Figure 5H:
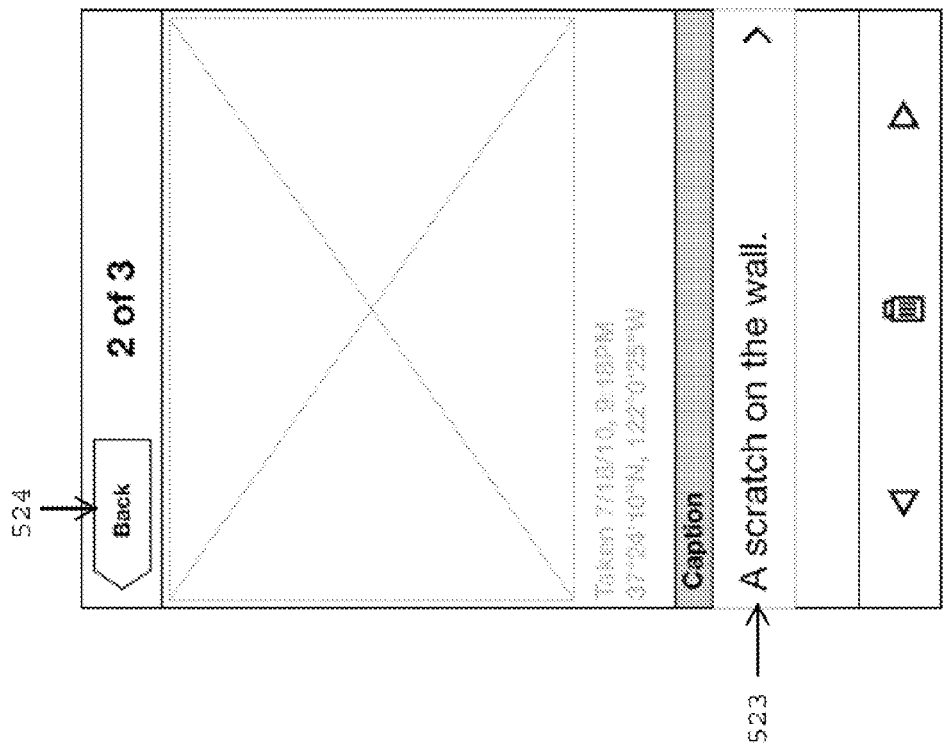
Figure 5G:
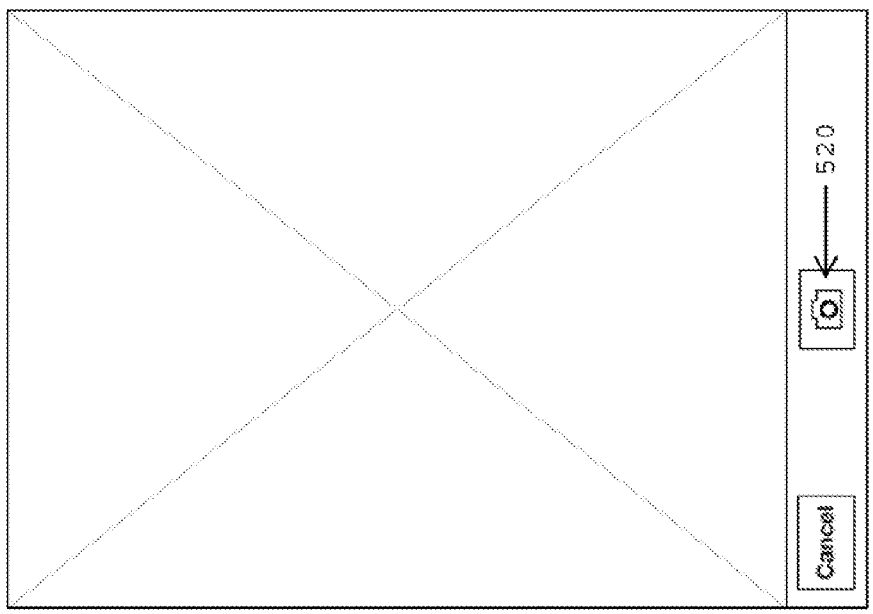
Figure 5J:
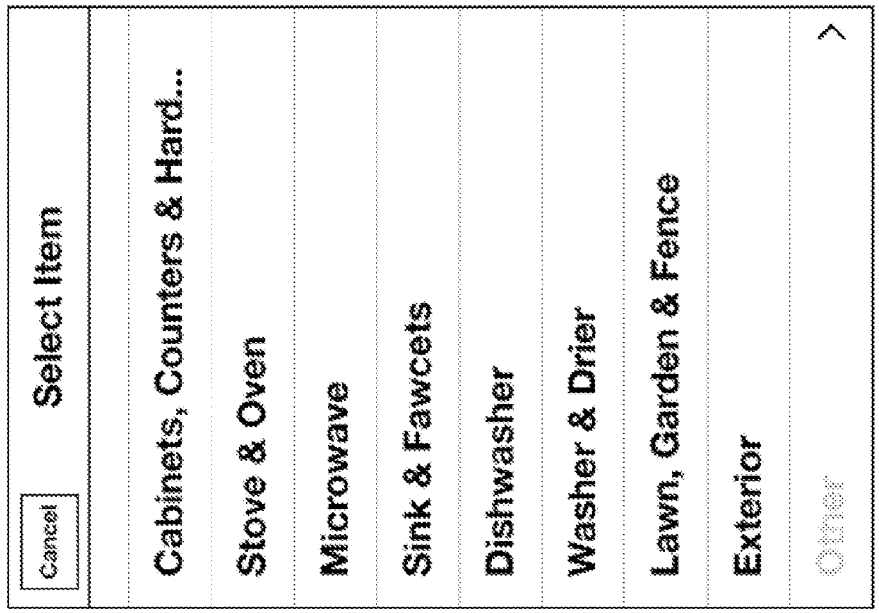

A space 523 is provided on the screen of FIG. 5H for a caption, which may be initially blank or have some default caption; tapping on the caption space 523 takes the user to a screen similar to that of FIG. 5F which again presents a virtual keyboard that allows the user to enter a desired caption such as the one shown in FIG. 5H. Tapping "Back" 524 returns the user to the screen of FIG. 5E, which will now include a thumbnail of the photograph just taken in one of the photograph boxes 519. Tapping on the thumbnail of the photograph will return the user to the screen of FIG. 5H to read or change the caption if desired.

Calling the camera function by tapping on the camera icon 520, or a text entry function with a virtual keyboard, such as by tapping on text cell 518, indicates to the mobile application that the type of data to be entered is a photograph or video, or text, respectively. The mobile application receives this indication, as in step 404 of FIG. 4, and is able to store the data in an appropriate format.

Tapping "Edit" 525 on the screen of FIG. 5E may take the user to a screen which allows for the deletion of either the text or any of the photographs that have been entered regarding the walls. The user may choose to delete any of the entered data or to leave it as is, and then will typically hit a "Back" or "Done" button to return to the screen of FIG. 5E, which will now show only data that has not been deleted. The user may then enter more data about the walls as above if desired.

Once the user hits "Back" 526 on FIG. 5E, the mobile application concludes that the user is done entering data on the walls, and stores data in the non-volatile memory of the mobile device. This indicates to the mobile application that there is no more data to enter, as in step 406 of FIG. 4.

If the mobile application has been programmed to store the data in a read-only format, then the data may no longer be changed or deleted, but additional data may be entered. On the other hand, if the mobile application is not programmed to store data in a read-only format, then the user may return to the described screens and modify or delete the data. In addition, as above, the mobile application may be programmed to send the data to the server at different times, and once the data is sent, the data on the server may not be changed.

Figure 5I:
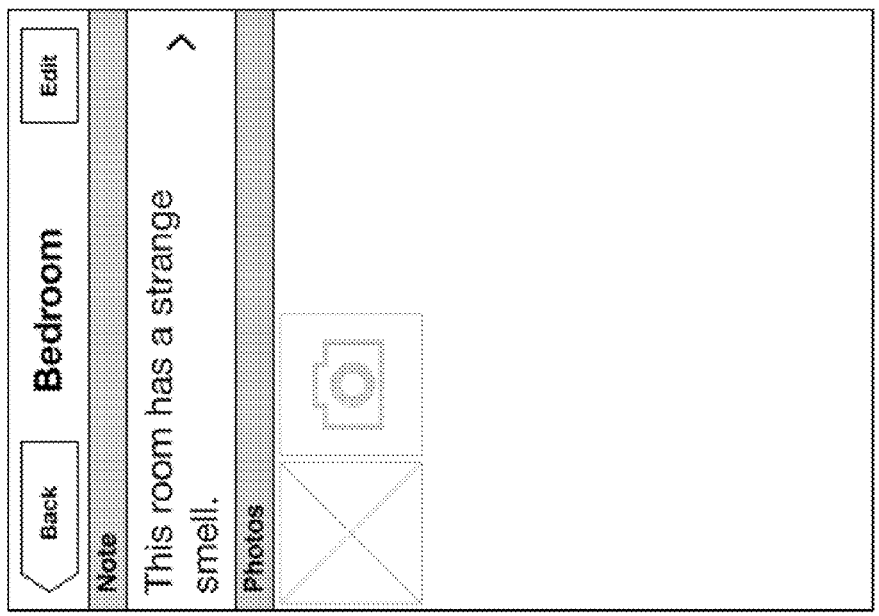

Tapping the summary cell "Bedroom" 508 on FIG. 5D may take the user to a screen like that shown in FIG. 5I, which allows the user to enter comments and photographs that are more general and about the room as a whole rather than about a specific item. The entry of such data is done in the same fashion as described above.

The other "spaces," i.e., rooms or "items," shown in FIG. 5C may be opened in the same way, and may result in screens like that of FIG. 5D, or alternatively screens that are more specifically tailored to the room selected. If there are items in any selected room that are not listed on the screen that is opened for that room, the user is again able to select "Add Item" if it is desirable to add something that is not in the template.

In some cases, tapping "Add Item," might result in the screen of FIG. 53, which presents a list of other items that might be present in a room. Selection of any of these items would result in the addition of such item to the list presented for the room, such as the screen of FIG. 5D for a bedroom. Again the user is able to define still other items that are not contained in the template. For example, the user might wish to list and inspect a fireplace; selecting "Other" allows the user to name the item, and then to inspect it, i.e., to add text or photographs as described above.

In alternative embodiments, selecting different rooms brings up different lists. Thus, items such as cabinets and counters, stove and oven, microwave, sink & faucets, and/or dishwasher may be included by default in the template for "Kitchen," while a "Bathroom" template might instead include cabinets and counters, sink and faucets, tub and shower, and toilet.

Figure 5K:
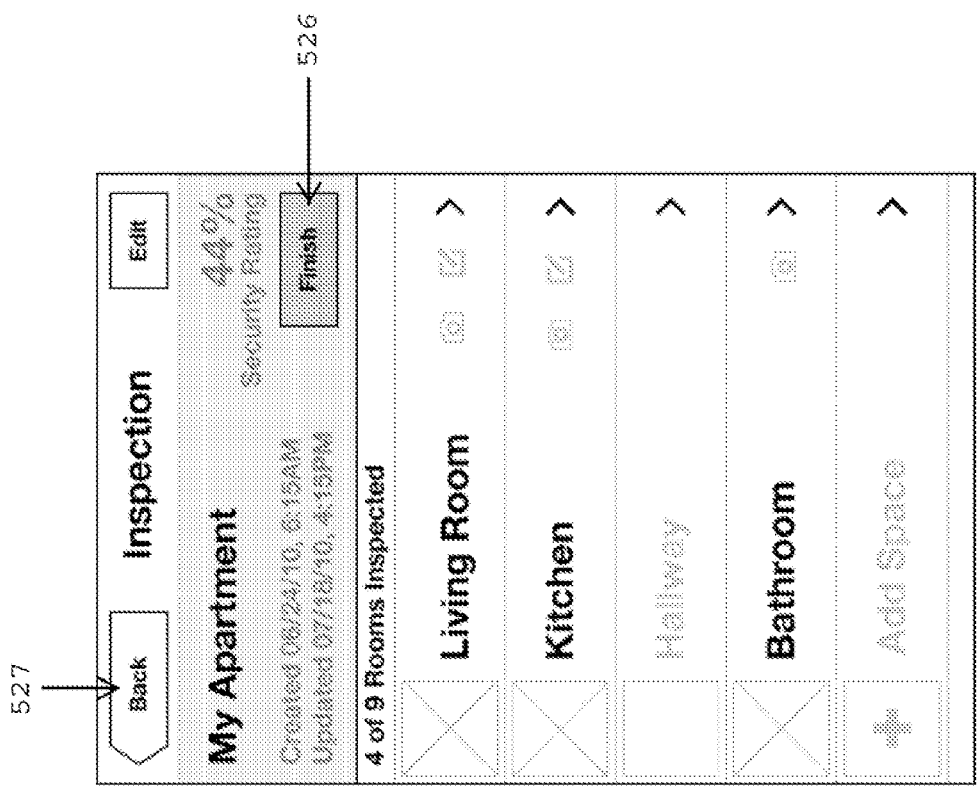

If a user taps "Done" or "Back" repeatedly on an inspection that is in progress, it is desirable that the user not return to the "new inspection" screen, but rather to some summary of the inspection. One example of such a screen is shown in FIG. 5K. The name given to the inspection by the user is shown, and the user has indicated which rooms are in the apartment being inspected, as shown here 9 rooms. Rooms for which data has been entered may be shown in bold type, and icons shown to indicate that text and/or photographs have been entered for each of those rooms. Rooms that have not been inspected may be displayed in gray type. A summary that "4 of 9 Rooms |have been| inspected," is presented, as are the dates on which the inspection was created and named, and the last date on which data was entered. If a rating is calculated as described above, it may be shown as well. The rating of 44% shown here may represent simply the number of rooms inspected (4 of 9 is 44%), or may as above be determined from a more calculated algorithm as desired.

Hitting the "Finish" box 526 on the screen of FIG. 5K may exit the inspection and result in an indication to the mobile application that there are no more elements to enter, as shown in step 407 of FIG. 4, causing the mobile application to send from the inspection to the server if not already sent. Hitting the "Back" box 527 may return the user to a list of inspections that are in progress, allowing the user to select one on which to proceed, or to start a new inspection.

Many other screens may be presented during an inspection and are omitted here for brevity. For example, deleting items may lead to screens asking for confirmation that the user is sure the data in question should be deleted. Where there are multiple inspections, there will presumably be a screen from which the user may select which inspection to view or continue. Such alternatives exist in many computer applications, particularly such as those for the iPhone, and will be readily apparent to those of skill in the art.

In one embodiment, the condition report that is generated from the entered data is viewable as one or more web pages via a web browser. For example, there may be a summary page for the asset similar to the summary screen provided on the mobile device, with additional pages for each element of the asset. Fields may be provided that are suitable for displaying the same types of data that may be entered on the mobile device, as will be apparent to one of skill in the art. If desired, additional information may be provided along with the data entered during the inspection, such as the date the report is "published," i.e. made available for viewing, the names of those who participated in the inspection, the names and/or email or web addresses of those with whom the report has been shared, etc. In addition, access to the report may be controlled in ways well known in the art, such as password protection, the requirement that one desiring to view the report receive an email containing a "token" that allows access, etc. Alternatively, the report may be prepared as a written document, although this will have certain limitations, i.e., audio must be transcribed, video cannot be included (although still images from video may be included), etc.

The invention has been explained above with reference to several embodiments. Other embodiments will be apparent to those skilled in the art in light of this disclosure. The present invention may readily be implemented using configurations other than those described in the embodiments above, or in conjunction with systems other than the embodiments described above. For example, while the collecting of certain types of files has been described herein, such as text documents, photographs, audio, video, etc., any type of file that may contain information about an asset may be used. The modules shown for the mobile application and server may be combined or in some cases omitted, and other modules and functionality may be added.

It should also be appreciated that the present invention can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc., or a computer network wherein the program instructions are sent over optical or electronic communication links. It should be noted that the order of the steps of the methods described herein may be altered and still be within the scope of the invention.

These and other variations upon the embodiments are intended to be covered by the present invention, which is limited only by the appended claims.

What is claimed is:

1. A method of inspecting an asset, comprising:
providing on a mobile computing device a graphical user interface indicating a plurality of pre-defined elements of the asset to be inspected and a plurality of types of data that may be entered, and for entering data in pre-defined fields in formats appropriate to each element and type of data;
receiving via the graphical user interface a selection of one or more of the plurality of pre-defined elements of the asset to be inspected;
receiving via the graphical user interface one or more of the plurality of types of data for each selected element;
automatically annotating the received data with the current time and the geo-location of the mobile computing device;
displaying on the graphical user interface a score indicating completeness of the received data, the score determined in part by comparing the received data for at least two of the pre-defined elements to an expected set of data;
transmitting the received selection and annotated data to a server;
storing the received selection and annotated data on the server in a manner in which they may not be modified, thereby creating an audit trail of the received selection and annotated data.

2. The method of claim 1 wherein the graphical user interface further indicates a plurality of pre-defined types of assets, and the method further comprises receiving via the graphical user interface a selection of one of the plurality of pre-defined types of assets to be inspected.

3. The method of claim 1 wherein automatically annotating the received data further comprises determining the geo-location of the mobile computing device with a GPS application in the mobile computing device.

4. The method of claim 1 wherein automatically annotating the received data further comprises receiving the geo-location of the mobile computing device from a cellular network.

5. The method of claim 1 further comprising automatically generating a report on the condition of the asset based upon the received selection and annotated data stored on the server.

6. The method of claim 5 wherein the report comprises a printed document.

7. The method of claim 5 wherein the report comprises a web page viewable in a browser window.

8. The method of claim 1 wherein one of the plurality of types of data that may be entered comprises text.

9. The method of claim 1 wherein one of the plurality of types of data that may be entered comprises an image.

10. The method of claim 1 wherein one of the plurality of types of data that may be entered comprises a photograph.

11. The method of claim 1 wherein one of the plurality of types of data that may be entered comprises audio.

12. The method of claim 1 wherein one of the plurality of types of data that may be entered comprises video.

13. The method of claim 1 wherein the asset is a building or a unit within a building and the pre-defined elements are spaces within the unit or building.

14. The method of claim 1 wherein the mobile computing device is a smart phone.

15. The method of claim 1 wherein the data stored on the server constitutes first data regarding the asset, the method further comprising:
collecting additional data regarding the asset at a later date and time by:

receiving via the graphical user interface an additional selection of one or more of the plurality of pre-defined elements of the asset to be inspected;

receiving via the graphical user interface additional data of one or more of the plurality of types of data for each selected element;

automatically annotating the received additional data with the current time and the geo-location of the mobile computing device;

transmitting the received selection and stored additional data to a server; and storing the transmitted additional data on the server in a manner in which the data may not be modified.

16. The method of claim 15 further comprising generating a report showing any change between the first data and the additional data that indicates a change in condition of the asset between the time the first data is received and the time the additional data is received.

17. The method of claim 1 wherein the predefined fields for one pre-defined element are different than the pre-defined fields for another pre-defined element.

18. The method of claim 17 wherein the asset is a building or a unit within a building, and the pre-defined elements are different types of spaces within the unit or building.

19. The method of claim 18 wherein one pre-defined element is a bedroom type of space and another pre-defined element is a kitchen type of space, the kitchen type of space having a pre-defined field for a sink that is not a pre-defined field for the bedroom type of space.

20. The method of claim 18 wherein one pre-defined element is a bedroom type of space and another pre-defined element is a bathroom type of space, the bathroom type of space having a pre-defined field for a tub or shower that is not a pre-defined field for the bedroom type of space.

21. The method of claim 1 wherein the score is determined in part by checking for whether data has been received for each of the plurality of pre-defined elements.

22. The method of claim 1 wherein the score is determined in part by checking a quality of the received data.

* * * * *